(12) United States Patent
Fujimaru et al.

(10) Patent No.: US 6,630,519 B2
(45) Date of Patent: Oct. 7, 2003

(54) PROCESS FOR PRODUCING POROUS POLYMER

(75) Inventors: Hirotama Fujimaru, Himeji (JP); Kenji Kadonaga, Takatsuki (JP); Kinya Nagasuna, Nara (JP); Kenji Minami, Otsu (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/168,847

(22) PCT Filed: Sep. 12, 2001

(86) PCT No.: PCT/JP01/07906

§ 371 (c)(1), (2), (4) Date: Sep. 27, 2002

(87) PCT Pub. No.: WO02/34797

PCT Pub. Date: May 2, 2002

(65) Prior Publication Data

US 2003/0069319 A1 Apr. 10, 2003

(30) Foreign Application Priority Data

Oct. 24, 2000 (JP) ......................................... 2000-324443

(51) Int. Cl.[7] .................................................. C08J 9/12
(52) U.S. Cl. .............................. 521/64; 521/62; 521/63
(58) Field of Search ............... 521/64, 62, 63

(56) References Cited

U.S. PATENT DOCUMENTS

| | | | |
|---|---|---|---|
| 5,189,070 A | 2/1993 | Brownscombe et al. | 521/64 |
| 5,200,433 A | 4/1993 | Beshouri | 521/64 |
| 5,210,104 A | 5/1993 | Bass et al. | 521/64 |
| 5,252,619 A | 10/1993 | Brownscombe et al. | 521/64 |
| 5,290,820 A * | 3/1994 | Brownscombe et al. | |
| 5,358,974 A | 10/1994 | Brownscombe et al. | 521/64 |
| 5,550,167 A | 8/1996 | DesMarais | 521/50 |

FOREIGN PATENT DOCUMENTS

| | | |
|---|---|---|
| EP | 0 060 138 A1 | 9/1982 |
| EP | 0 239 360 A2 | 9/1987 |
| JP | 62-250002 | 10/1987 |
| JP | 7-505667 | 6/1995 |
| JP | 9-503531 | 4/1997 |
| JP | 11-511496 | 10/1999 |
| JP | 2000-500796 | 1/2000 |
| WO | WO 95/04105 | 2/1995 |
| WO | WO 97/18246 | 5/1997 |
| WO | WO01/41992 | 6/2001 |

* cited by examiner

*Primary Examiner*—Morton Foelak
(74) *Attorney, Agent, or Firm*—Fish & Richardson P.C.

(57) ABSTRACT

This invention concerns a method for the production of a porous polymer from a water-in-oil type high internal phase emulsion (HIPE). By using an oil-soluble polymerization initiator as the polymerization initiator, the method for producing a porous polymer with outstanding characteristics in a very short period even when the porous polymer is produced from an HIPE exhibiting a viscosity of not more than 500 mPa second at the emulsion formation temperature or when the porous polymer to be produced possesses a number-average pore diameter of not less than 80 μm is provided.

22 Claims, No Drawings

PROCESS FOR PRODUCING POROUS POLYMER

TECHNICAL FIELD

This invention relates to a method for producing a porous polymer having continuous cells (hereinafter referred to occasionally as "open cells") having through holes formed in both the surface and the interior thereof by polymerizing a water-in-oil type high internal phase emulsion (hereinafter referred to occasionally as "HIPE"), and more particularly to a method for producing the porous polymer by polymerizing (curing) the HIPE in a very short period.

The porous polymer of this invention can be extensively utilized as (1) liquid absorbents; such as ① cores of disposable diapers, i.e. absorbents for such body fluids as urine and blood and ② treating agents for waste water and spent oil and treating agents for waste solvents, i.e. absorbents for water, aqueous liquids, oils, and organic solvents, (2) energy absorbents, such as sound insulators and heat insulators for automobiles and buildings, i.e. absorbents for sound and heat and (3) carrier for chemicals, such as household goods impregnated with aromatics, detergents, polishing agents, surface protecting agents, and flameproofing agents.

BACKGROUND ART

The term "HIPE" refers to such an emulsion as has a water phase, namely the dispersed phase (internal phase), and an oil phase, namely the external phase, at a ratio (W/O ratio) of not less than about 3/1. The fact that a porous polymer is produced by the method of polymerizing this HIPE has been known to the art. The porous polymer produced from the HIPE is excellent because it tends to grow into a porous polymer of low density possessed of open cells of a fine diameter, whereas the porous polymer produced by using a foaming agent without being converted into the HIPE tends to grow into a porous polymer possessed of closed cells of a comparatively large diameter.

Methods for producing a porous polymer from the HIPE are disclosed in JP-A-57-98713, JP-A-62-50002, U.S. Pat. No. 5,210,104, U.S. Pat. No. 5,252,619, U.S. Pat. No. 5,189,070, and U.S. Pat. No. 5,358,974, for example.

JP-A-57-98713 and JP-A-62-50002 disclose a method which comprises preparing the HIPE containing a water-soluble and/or oil-soluble polymerization initiator and thermally polymerizing this HIPE at a temperature in the range of 50° C. to 60° C. for a period in the range of 8 hours to 72 hours. U.S. Pat. No. 5,210,104 discloses a method which comprises preparing an HIPE and subsequently adding a polymerization initiator thereto, U.S. Pat. No. 5,252,619 discloses a method which comprises preparing an HIPE containing a polymerization initiator and then polymerizing the HIPE at a temperature of not lower than 90° C., and U.S. Pat. No. 5,189,070 discloses a method which comprises forming a gel possessing a prescribed dynamic shear modulus from an emulsion at a temperature of 20—not higher than 65° C. and subsequently polymerizing the gel at a temperature of not lower than 70° C. Then, U.S. Pat. No. 5,358,974 discloses a method which comprises polymerizing an HIPE by the use of an alkyl peroxy dicarbonate branched from the carbon atom at the 1 position, namely an oil-soluble polymerization initiator.

The methods which are disclosed in JP-A-57-98713, JP-A-62-50002, and U.S. Pat. No. 5,358,974, however, are not good in production efficiency because they require long period for polymerization. Though the polymerization carried out at such high temperatures as described in U.S. Pat. No. 5,252,619 and U.S. Pat. No. 5,189,070 can be completed in comparatively short period, it still requires about several hours. The stability of the HIPE decreases under certain condition, and liberation of a large quantity of water tends to occur. As a result, a porous polymer having a prescribed pore diameter cannot be obtained. Further, U.S. Pat. No. 5,210,104 contains a statement to the effect that since the polymerization initiator is added after the preparation of the HIPE, the stability of the emulsification of the HIPE is indeed improved, but the polymerization requires several hours.

The present inventors have pursued a diligent study emphatically on the polymerization time of the HIPE with a view to developing a method for producing by the HIPE method a porous polymer in a very short period and have consequently found a method for shortening the polymerization time to a very short period such as, for example, not more than 30 minutes and preferably not more than 10 minutes by elevating the temperature of an emulsified HIPE at a specific rate of temperature increase (refer to International Publication of Unexamined Patent Application WO 01/27164).

It has been made clear, however, that when a specific HIPE such as, for example, an HIPE possessing such a low viscosity as not more than 500 mPa second is polymerized by following this method and/or when a porous polymer having such a large number-average pore diameter as not less than 80 $\mu$m, the use of this method will not greatly shorten the polymerization time and, on the contrary, will have the possibility of decreasing the stability of the HIPE, making it impossible to obtain a porous polymer having a prescribed pore diameter, and suffering the HIPE to undergo phase separation till collapse.

An object of this invention, therefore, is to solve the technical problem described above and provide a method for the production of a porous polymer by the polymerization of an HIPE, and more particularly to provide a method for producing the porous polymer within such a very short period as, for example, not more than 30 minutes and preferably not more than 10 minutes even in the production of a porous polymer of a large pore diameter from an HIPE possessing such a low viscosity as not more than 500 mPa second

DISCLOSURE OF THE INVENTION

When a water-soluble polymerization initiator is singly used in the polymerization of an HIPE, since the polymerization initiator is decomposed to generate a radical in the water phase of the HIPE, the polymerization reaction proceeds from the interface between the water phase and the oil phase and gradually advances toward the interior of the oil phase. Thus, the rate of polymerization increases in proportion as the distance to the interface between the oil phase and the water phase decreases and the strength of the pores in the porous polymer is high at the surface parts of the pores. The porous polymer, therefore, is characterized by having improved texture.

As a means to shorten the polymerization time, the method of heightening the radical concentration in the polymer system is conceivable. In the case of producing a porous polymer having such a small number-average pore diameter as falling short of 80 $\mu$m by polymerizing an HIPE with a higher viscosity than 500 mPa·second, since the emulsion of an HIPE with a high viscosity generally has a small particle diameter, this method can shorten the polymerization time with no conspicuous variation when a water-soluble polymerization initiator is singly used, when an oil-soluble polymerization initiator is singly used, or when a water-soluble polymerization initiator and an oil-soluble polymerization initiator are used in combination.

In the case of producing a porous polymer having such a large number-average pore diameter as exceeding 80 μm by polymerizing an HIPE with a lower viscosity than 500 mPa·second, however, since the emulsion generally has a large particle diameter, the area of the interface between the water phase and the oil phase is decreased. When the HIPE is polymerized by using a water-soluble polymerization initiator singly as mentioned above, therefore, since the rate of transfer of a radical from the water phase to the oil phase is restrained, the efficiency of the polymerization initiator, namely the quantity of radical generated that is consumed in the reaction of polymerization, is markedly degraded. It has been made clear that the rate of polymerization of the HIPE is consequently lowered markedly.

It is in consideration of the fact mentioned above that this invention has been perfected. To be specific, this invention concerns a method for producing a porous polymer by comprising a step of polymerizing an HIPE with such a low viscosity as falling short of 500 mPa second in the presence of a polymerization initiator and/or a method for producing a porous polymer having a number-average pore diameter of not less than 80 μm, which method is characterized by using as a polymerization initiator an oil-soluble polymerization initiator, preferably a water-soluble polymerization initiator and an oil-soluble polymerization initiator in combination. Owing to the use of this polymerization initiator, it is made possible to produce a porous polymer in a very short period even when a porous polymer having a large pore diameter is produced by using an HIPE with a low viscosity.

BEST MODE FOR EMBODIMENT OF THE INVENTION

Now, the method for producing a porous polymer according to this invention will be described below with reference to the component steps of process sequentially in the order of occurrence.

[I] Preparation of HIPE (1) Raw Material to be Used for HIPE

The raw material to be used for the HIPE is generally required only to contain (a) a polymerizing monomer, (b) a cross-linking monomer, and (c) a surfactant as components for forming an oil phase and (d) water as a component for forming a water phase. It may optionally contain (e) a polymerization initiator, (f) a salt, and (g) other additives as arbitrary components for forming the oil phase and/or the water phase.

(a) Polymerizing Monomer

The polymerizing monomer does not need to be particularly restricted but is only required to have one polymerizing unsaturated group in the molecular unit thereof and to be polymerizable in the HIPE and capable of forming bubbles. The polymerizing monomer preferably contains a (meth) acrylic ester at least partly, more preferably contains the (meth)acrylic ester at a ratio of not less than 20 mass %, and particularly preferably contains the (meth)acrylic ester at a ratio of not less than 35 mass %. By containing such a (meth)acrylic ester as a polymerizing monomer, the porous polymer is improved in plasticity and toughness.

As concrete examples of the polymerizing monomer, aryl monomers such as styrene; monoalkylene allylene monomers such as ethyl styrene, α-methyl styrene, vinyl toluene, and vinyl ethyl benzene; (meth)acrylic esters such as methyl (meth)acrylate, ethyl (meth)acrylate, butyl (meth)acrylate, isobutyl(meth)acrylate, isodecyl(meth)acrylate, 2-ethylhexyl(meth)acrylate, lauryl (meth)acrylate, stearyl (meth)acrylate, cyclohexyl(meth)acrylate, and benzyl (meth)acrylate; chlorine-containing monomers such as vinyl chloride, vinylidene chloride, and chloromethyl styrene; acrylonitrile compounds such as acrylonitrile and methacrylonitrile; and vinyl acetate, vinyl propionate, n-octadecyl acrylamide, ethylene, propylene, and butene may be cited. These polymerizing monomers may be used either singly or in the form of a combination of two or more members.

The quantity of the polymerizing monomer mentioned above to be used is preferably in the range of 10–99.9 mass %, more preferably in the range of 30–99 mass %, still more preferably in the range of 30–70 mass % based on the total quantity of the whole monomer component comprising the polymerizing monomer mentioned above and a cross-linking monomer which will be specifically described herein below. If the quantity of the polymerizing monomer falls short of 10 mass %, the shortage will be at a disadvantage in posing the possibility of rendering the produced porous polymer brittle and deficient in the absorbent capacity. Conversely, if the quantity of the polymerizing monomer exceeds 99.9 mass %, the excess will be at a disadvantage in opening the possibility of rendering the produced porous polymer deficient in strength and elastic recovery and of failing to secure fully satisfactory absorbent capacity and speed of water absorption.

(b) Cross-Linking Monomer

The cross-linking monomer does not need to be particularly restricted but is only required to possess at least two polymerizing unsaturated groups in the molecular unit thereof and to be polymerizable in the HIPE and capable of forming bubbles similarly to the polymerizing monomer mentioned above.

As concrete examples of the cross-linking monomer, aromatic monomers such as divinyl benzene, trivinyl benzene, divinyl toluene, divinyl xylene, ethyl divinyl benzene, divinyl naphthalene, divinyl alkyl benzenes, divinyl phenanthrene, divinyl biphenyl, divinyl diphenyl methane, divinyl benzyl, divinyl phenyl ether, and divinyl diphenyl sulfide; oxygen-containing monomers such as divinyl furan; sulfur-containing monomers such as divinyl sulfide and divinyl sulfone; aliphatic monomers such as butadiene, isoprene, and pentadiene; and ester compounds of polyhydric alcohols with acrylic acid or methacrylic acid such as ethylene glycol di(meth)acrylate, diethylene glycol di(meth)acrylate, triethylene glycol di(meth)acrylate, polyethylene glycol di(meth)acrylate, 1,3-butane diol di(meth) acrylate, 1,4-butane diol di(meth)acrylate, 1,6-hexane diol di(meth)acrylate, octane diol di(meth) acrylate, decane diol di(methy)acrylate, trimethylol propane di(meth)acrylate, trimethylol propane tri(meth)acrylate, pentaerythritol di(meth) acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra (meth)acrylate, N,N'-methylene bis(meth)acrylamide, triallyl isocyanurate, triallyl amine, tetraallyloxy ethane, and hydroquinone, catechol, resorcinol, and sorbitol may be cited. These cross-linking monomers may be used either singly or in the form of a combination of two or more members.

The quantity of the cross-linking agent to be used is preferably in the range of 0.1–90 mass %, more preferably in the range of 1–70 mass %, and particularly preferably in the range of 30–70 mass %, based on the mass of the whole monomer component comprising the polymerizing monomer and the cross-linking monomer mentioned above. If the quantity of the cross-linking monomer to be used falls short of 0.1 mass %, the shortage will open the possibility of rendering the produced porous polymer deficient in strength and elastic recovery, preventing it from acquiring fully satisfactory capacity for absorption per unit volume or per unit mass, and not enabling it to secure satisfactory capacity and speed of absorption. Conversely, if the quantity of the cross-linking monomer to be used exceeds 90 mass %, the excess will possibly result in embrittling the porous polymer and preventing it from acquiring a sufficient water absorption capacity.

(c) Surfactant

The surfactant does not need to be particularly restricted but is only required to be capable of emulsifying the water phase in the oil phase forming the HIPE. The nonionic surfactants, cationic surfactants, anionic surfactants, and amphoteric surfactants which have been heretofore known to the art are usable.

As concrete examples of the nonionic surfactants, nonyl phenol polyethylene oxide adduct; block polymer of ethylene oxide and propylene oxide; sorbitan fatty acid esters such as sorbitan monolaurate, sorbitan monomyristylate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monooleate, decaglycerol trioleate, and self-emulsifying glycerol monostearate; polyoxyethylene alkyl ethers such as polyoxyethylene lauryl ether, polyoxyethylene cetyl ether, polyoxyethylene stearate ether, polyoxyethylene oleyl ether, and polyoxyethylene higher alcohol ethers; polyoxyethylene alkylaryl ethers such as polyoxyethylene nonyl phenyl ether; polyoxyethylene sorbitan fatty acid esters such as polyoxyethylene sorbitan monolaurate, polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate; polyoxy-ethylene sorbitol fatty acid esters such as tetraoleinic acid polyoxyethylene sorbitol; polyoxyethylene fatty acid esters such as polyethylene glycol monolaurate, polyethylene glycol monostearate, polyethylene glycol distearate, and polyethylene glycol monooleate; polyoxyethylene alkyl amines; polyoxyethylene hydrogenated castor oil; and alkyl alkanol amide may be cited. The HLB values of these nonionic surfactants are properly not exceeding 10 and preferably falling in the range of 2–6. These nonionic surfactants may be used in the form of a combination of two or more members. The combined use of such nonionic surfactants possibly results in improving the HIPE in stability.

As concrete examples of the cationic surfactant, quaternary ammonium salts such as stearyl trimethyl ammonium chloride, ditallow dimethyl ammonium methyl sulfate, cetyl trimethyl ammonium chloride, distearyl dimethyl ammonium chloride, alkylbenzyl dimethyl ammonium chloride, and lauryl trimethyl ammonium chloride; alkyl amine salts such as coconut amine acetate and stearyl amine acetate; alkyl betaines such as lauryl betaine, stearyl betaine, and lauryl carboxy methyl hydroxy ethyl imidazolinium betaine; and amine oxides such as lauryl dimethyl amine oxide may be cited. By using such a cationic surfactant, it is made possible, though occasionally, to impart an excellent antibacterial property to the produced porous polymer when the porous polymer is utilized as in absorbent.

Incidentally, when a nonionic surfactant and a cationic surfactant are jointly used, they possibly improve the HIPE in stability.

The quantity of the surfactant to be used is preferably in the range of 1–30 parts by mass and more preferably in the range of 3–15 parts by mass, based on 100 parts by mass of the whole monomer component comprising a polymerizing monomer and a cross-linking monomer. If the quantity of the surfactant to be used falls short of 1 part by mass, the shortage will possibly result in rendering the high dispersibility of the HIPE unstable or preventing the surfactant from manifesting fully satisfactorily the action and the effect inherent therein. Conversely, if the quantity of the surfactant to be used exceeds 30 parts by mass, the excess will possibly result in rendering the produced porous polymer excessively brittle. Further, this excess will fail to contribute to economy because it cannot be expected to bring a proportionate addition to the effect inherent therein.

(d) Water

As the water usable effectively herein, the waste water originating in the production of a porous polymer and recovered with the aim of promoting reclamation of a plant effluent may be utilized directly in its unmodified form or after undergoing a prescribed treatment besides tap water, purified water, or deionized water.

The quantity of the water mentioned above to be used might be properly selected to suit the purpose for which the porous polymer possessing open cells is used (such as, for example, water absorbent, oil absorbent, sound insulator, and filter). Specifically, since the void ratio of the porous polymer is decided by changing the water phase/oil phase (W/O) ratio of the HIPE, the quantity of the water to be used is automatically decided by selecting such a W/O ratio as equals a void ratio conforming the use and the object.

(e) Polymerization Initiator

For the purpose of accomplishing the object of this invention, namely the polymerization of an HIPE having a viscosity of not more than 500 mPa second and/or the production of a porous polymer having a number-average pore diameter of not less than 80 $\mu$m in a very short period, it is necessary to use an oil-soluble polymerization initiator as an essential component for the polymerization initiator. This necessity forms an important requirement for the construction of this invention. As the polymerization initiator for use in this invention, the oil-soluble polymerization initiator may be used singly. Preferably, however, the oil-soluble polymerization initiator is used in combination with a water-soluble polymerization initiator. These polymerization initiators do not need to be particularly limited so long as they are generally usable in emulsion polymerization.

As concrete examples of the water-soluble polymerization initiator, azo compounds such as 2,2'-azobis(2-amidinopropane)dihydrochloride; persulfates such as ammonium persulfate, potassium persulfate, and sodium persulfate; and peroxides such as potassium peracetate, sodium peracetate, potassium percarbonate, and sodium percarbonate may be cited. These water-soluble polymerization initiators may be used either singly or in the form of two or more members. When two or more polymerization initiators are used in a combined form, they are to have different 10-hour half-life temperatures, i.e. the temperatures at which the concentrations of the relevant compounds are halves in 10 hours.

The quantity of the water-soluble polymerization initiator to be used is preferably in the range of 0.01–10 mol %, and more preferably in the range of 0.1–5.0 mol %, based on the total number of mols of the monomer component comprising a polymerizing monomer and a cross-linking monomer. Then, for the purpose of completing the polymerization in a short period and exalting the physical properties of the produced porous polymer, it is advantageous to control the quantity of the polymerization initiator to be decomposed within an expected polymerization time in the range of 0.05–2.0 mol % based on the total number of mols of the monomer component comprising a polymerizing monomer and a cross-linking monomer.

As concrete examples of the oil-soluble polymerization initiator, hydroperoxides such as cumene hydroperoxide, t-butyl hydroperoxide, diisopropyl peroxide, p-menthane hydroperoxide, and 1,1,3,3-tetrabutyl hydroperoxide; dialkyl peroxides such as di-t-butyl peroxide, 2,5-dimethyl-2,5-di(t-butyl peroxy) hexane, t-butyl cumyl peroxide, and dicumyl peroxide; peroxy dicarbonates such as di-isopropylperoxy dicarbonate, dicyclohexylperoxy dicarbonate, di(s-butyl)peroxy dicarbonate, and di(2-ethylhexyl)peroxy dicarbonate; diacyl peroxides such as acetyl peroxide, propionyl peroxide, decanoyl peroxide isobutylyl peroxide, octanoyl peroxide, lauroyl peroxide, stearyroyl peroxide, and benzoyl peroxide; peroxy ketals such as 1,1'-di-(t-butyl peroxy)cyclohexane, and 1,1'-di-(t-butyl peroxy)cyclohexane-3,3,5-trimethyl cyclohexane; ketone peroxides such as cyclohexanone peroxide, methyl cyclohexanone peroxide, methyl ethyl ketone peroxide, and acetyl acetone peroxide; and peroxy esters such as cumyl peroxy neodecanoate, 1,1,3,3-tetramethylbutyl peroxy neodecanoate, 1-cyclohexyl-1-1-methylethyl peroxy neodecanoate, t-hexyl peroxy neodecanoate, t-butyl peroxy isobutyrate, t-butyl peroxy pivalate, 1,1,3,3,-tetramethyl butyl peroxy 2-ethylhexanoate, 2,5-dimethyl-2,5-di(2-ethylhexanoyl peroxy) hexane, 1-cyclohexyl-1-1-methylethyl peroxy-2-hexanoate, t-amyl peroxy 2-ethylhexanoate, and t-butyl peroxy 2-ethylhexanoate may be cited.

These oil-soluble polymerization initiators may be used either singly or in the form of two or more members. When two or more polymerization initiators are used in a combined form, they are preferred to have different 10-hour half-life temperatures, i.e. the temperatures at which the concentrations of the relevant compounds are halves in 10 hours.

The quantity of the oil-soluble polymerization initiator to be used is preferably in the range of 0.05–15 mol % and more preferably in the range of 0.1–10 mol %, based on the total number of mols of the monomer component comprising a polymerizing monomer and across-linking monomer. Then, for the purpose of terminating the polymerization in a short period and exalting the physical properties of the produced porous polymer, it is advantageous to control the quantity of the polymerization initiator to be decomposed within an expected polymerization time in the range of 0.05–5.00 mol %, preferably in the range of 0.50–3.00 mol %, based on the total number of mols of the monomer component comprising a polymerizing monomer and a cross-linking monomer.

By setting the quantity of the aforementioned oil-soluble polymerization initiator to be used at not less than 0.05 mol %, it is made possible to lessen the residual monomer component and decrease the quantity of the residual monomer in the produced porous polymer.

Further, by setting the quantity of the oil-soluble polymerization initiator to be used at not less than 0.05 mol % and quantity of the polymerization initiator decomposed within the polymerization time of the oil-soluble polymerization initiator at not less than 0.05 mol % as well, it is made possible not only to decrease the residual monomer component but also to decrease the residual oil-soluble polymerization initiator and further decrease the residual monomer and the residual polymerization initiator in the produced porous polymer.

Then, by setting the quantity of said oil-soluble polymerization initiator to be used at not more than 15 mol % and the quantity of the oil-soluble polymerization initiator decomposed within the polymerization time at not more than 5.0 mol %, it is made possible to facilitate the control of the polymerization and impart expected mechanical properties (tensile strength, compressive strength, resistance to creep, etc.) to the produced porous polymer.

Now, the quantity of the polymerization initiator (mol %) to be decomposed within the polymerization time will be explained below. The quantity of the polymerization initiator (mol %) to be decomposed within the polymerization time is found by first computing the quantity of the polymerization initiator decomposed (mol) and then reducing this quantity to the percentage (mol %) based on the total number of mols of the monomer component used.

The expression "quantity of the polymerization initiator to be decomposed" refers to the quantity of the polymerization initiator which is decomposed within the polymerization time. This quantity can be found by ① the method of calculating the quantity by using the formula for the rate of decomposition of a polymerization initiator reported in literature or ② the method of calculating the quantity by using the activating energy for a polymerization initiator and the half-life temperature such as one-minute half-life temperature, one-hour half-life temperature, 10-hour half-life temperature, or 100-hour half-life temperature, namely the temperature at which the concentration of a given polymerization initiator is halved in one minute, one hour, 10 hours, or 100 hours respectively as reported in literature. The present invention selects the calculation of ① where sodium persulfate, potassium persulfate, or ammonium persulfate is used as the polymerization initiator or the calculation of ② where some other compounds are used as the polymerization initiator.

First, the case that the polymerization initiator is sodium persulfate, potassium persulfate, or ammonium persulfate will be explained. The constant k of the rate of decomposition of a given polymerization initiator at the relevant polymerization temperature (K) is determined by substituting this polymerization temperature in the following formula 1 in the case of sodium persulfate or potassium persulfate or in the following formula 2 in the case of ammonium persulfate.

Rate constant k of decomposition of polymerization initiator (min.$^{-1}$) at polymerization temperature $(K)=60\times10^{\{12.5-5920/(polymerization\ temperature(K))\}}$ (Formula 1)

Rate constant $k$ of decomposition of polymerization initiator (min.$^{-1}$) at polymerization temperature $(K)=60\times10^{\{12.7-6830/(polymerization\ temperature(K))\}}$ (Formula 2)

The term "polymerization temperature (K)" refers to the outcome of the reduction of the average polymerization temperature (° C.) between the initial stage of polymerization and the completion of polymerization to the absolute temperature (K). It means the average temperature for the polymerization time inclusive of the step of temperature increase and is determined, for example, as follows. In the case of an operation using a polymerization initiating temperature of 60° C., ascending the temperature at a rate of 20° C. till 100° C., and thereafter performing a polymerization at 100° C. for 10 minutes (total: 12 minutes), the polymerization temperature (K) is found as follows.

Polymerization temperature $(K) =273+\{60\times2+(100-60)\times2/2+100\times10\}/12=369.7K$ (5)

The rate constant k of decomposition of the polymerization initiator at the polymerization temperature (K) is determined by the method described above and then the quantity of the polymerization initiator decomposed is calculated from the relationship on the rate constant of the decomposition of the polymerization initiator, the polymerization time, and the quantity of the polymerization initiator to be charged, as shown by the following formula 3.

The quantity of the polymerization initiator decomposed=the quantity of the polymerization initiator to be used×{1−exp[−rate constant $k$ of decomposition of polymerization initiator at polymerization temperature (min.$^{-1}$)×polymerization time(min.)]} (Formula 3)

The quantity of the polymerization initiator decomposed (mol) which is found as shown above is then reduced to the percentage (mol %) relative to the total number of mols of the used monomer component comprising a polymerizing monomer and a cross-linking monomer, and the quantity of the polymerization initiator (mol %) decomposed within the polymerization time is calculated.

When the HIPE formed by using 0.1 mol of potassium persulfate at 65° C. is heated for 1.5 minutes till 95° C. (temperature ascending rate 20° C./min.) and polymerized by being retained at 95° C. for 8.5 minutes, for example, the polymerization time is 10 minutes and the polymerization temperature is 365.75K. The constant k of the rate of decomposition of the polymerization initiator at this temperature is found from Formula 1 to be 0.0123 (min.$^{-1}$). By subsequently using Formula 3, the quantity of the polymerization initiator decomposed at the polymerization temperature and the polymerization time is calculated to be 0.0116 mol. The quantity of the polymerization initiator decomposed within the polymerization time is found by simply reducing the quantity of the polymerization initiator decomposed which is determined as shown above to the percentage (mol %) relative to the total number of mols of the monomer component used.

Next, the case of using other polymerization initiator will be explained below. In this case, the relationship of the polymerization temperature (K) and the rate constant k of decomposition of the polymerization initiator (min.$^{-1}$) corresponding to Formula 6 shown below is found for each of the polymerization initiators by performing calculations using the relationship of the activating energy of a relevant polymerization initiator and the one-minute half-life temperature, one-hour half-life temperature, 10-hour half-life temperature, or 100-hour half-life temperature reported in catalogs, technical information, and literature, and Formula 4 and Formula 5 shown below. And the quantity of polymerization initiator decomposed within the polymerization time is calculated on the basis of Formula 3 shown above.

Half-life time (min.) at prescribed temperature = (Formula 4)
{1/[rate constant $k$ of decomposition of polymerization initiator at prescribed temperature (min.$^{-1}$)]}×Ln 2

-continued

Ln{Rate constant $k$ of decomposition of polymerization initiator (min.$^{-1}$)} = (Formula 5)
Ln A − {Activating energy Ea (J/mol)/[Gas constant R (J/mol)×polymerization temperature (K.)]

R denotes the gas constant, 8.3184 (J/mol), Ln denotes the natural logarithm, and A denotes the constant which varies with the polymerization initiator.

When the one-minute half-life temperature is 100° C. (373K), for example, Formula 4 gives this result.

1(min.)={1/[Rate constant of decomposition of polymerization at 100° C., $k_{373}$(min.$^{-1}$)]}×Ln2

First, the rate constant k of decomposition of a given polymerization initiator at a prescribed temperature is calculated by using Formula 4 and then the constant A of the polymerization initiator is calculated by using Formula 5.

For example, the compound, t-butylperoxy (2-ethylhexanoate), made by Nippon Oils & Fats Co., Ltd. and sold under the trademark designation of "Perbutyl O" is claimed to have a 10-hour half temperature of 72.5° C. (345.5K) and an activating energy of 28.8 Kcal/mol (120.56 kJ/mol). When the calculation, therefore, is carried out in this case by using the relationship of Formula. 4, thus;

600(min.)=1/[Rate constant of decomposition of polymerization initiator at 345.5K, $K345.5K$(min.$^{-1}$)×$Ln2$ And the outcome of this calculation is as follows.

$k_{345.5K}=1.1552\times10^{-3}$(min.$^{-1}$)

By substituting the rate constant of decomposition of the polymerization initiator at 345.5K, namely $k_{345.5K}$ (min.$^{-1}$), in Formula 5, the following relationship $Ln(1.1552\times10^{-3})=LnA--\{120560/(8.3184\times345.5)\}$ And the constant A for the compound, t-butylperoxy (2-ethylhexanoate), therefore, is calculated as follows.

$A=1.91\times10^{15}$

Subsequently, the relationship 6 of the polymerization temperature (K) and the rate constant k of decomposition of the polymerization initiator (min.$^{-1}$) in the case of the compound, t-butylperoxy (2-ethylhexanoate), is derived by using the constant A found by the calculation and the relationship of Formula 5 as follows.

Rate constant of decomposition, $k$(min.$^{-1}$), of polymerization initiator, t-butylperoxy(2-ethylhexanoate)=$1.91\times10^{15}\times\exp\{-120560/(8.3184\times$polymerization temperature $T(K)\}$ (Formula 6)

By using Formula 6 mentioned above, it is made possible to decide from the polymerization temperature T (K) the rate constant k of decomposition of the polymerization initiator at that polymerization temperature. Then, by substituting this constant in Formula 3 mentioned above, it is made possible to calculate the quantity of decomposition of the polymerization initiator, namely t-butylperoxy (2-ethylhexanoate)

When the HIPE formed by using 2 mols of t-butylperoxy (2-ethylhexanoate) at 65° C. is heated for 1.5 minutes till 95° C. (ascending rate 20° C./min.) and polymerized by being retained at 95° C. for 8.5 minutes, for example, the polymerization time is 10 minutes and the polymerization temperature is 365.75K. From Formula 6, the rate constant k of decomposition of the polymerization initiator, k, at 365.75° K. is found to be 0.0118 (min.$^{-1}$) Subsequently, by using formula 3, the quantity of the polymerization initiator decomposed in this case is calculated to be 0.223 mol. Consequently, the quantity of the polymerization initiator (mol %) decomposed within the polymerization time can be found by reducing the quantity of the polymerization initiator decomposed to the percentage (mol %) relative to the total number of mols of the whole monomer component used in this case.

As concrete examples of the means to control the quantity of the polymerization initiator decomposed, the optimization of the quantity of the polymerization initiator to be used, the polymerization temperature and the rate of temperature increase, and the introduction of a proper quantity of a radical trapping agent may be cited. This means nevertheless does not need to be particularly restricted.

Further, in the calculation of the quantity of the polymerization initiator to be decomposed within the polymerization time, when the method mentioned above is not easily adapted to a given system, a method of determination and a method of calculation which fit each occasion may be adopted.

It is permissible to use a redox polymerization initiator which is formed by combining the polymerization initiator with a reducing agent. As concrete examples of the water-soluble reducing agent, sodium hydrogen sulfite, potassium hydrogen sulfite, sodium thiosulfate, potassium thiosulfate, L-ascorbic acid, erysorbic acid, ferrous salts, formaldehyde sodium sulfoxylate, glucose, dextrose, triethanol amine, and diethanol amine may be cited. As concrete examples of the oil-soluble reducing agent, dimethyl aniline, tin octylate, and cobalt naphthenate may be cited. These reducing agents used in the redox polymerization initiator system may be used either singly or in the form of two or more members.

The ratio of content (ratio by mass) of the reducing agent in the redox polymerization initiator, i.e. polymerization initiator (oxidizing agent)/reducing agent, is in the approximate range of 1/0.01–1/10 and preferably in the range of 1/0.2–1/5.

(f) Salt

A salt may be used when it is necessary for the purpose of improving the HIPE in stability.

As concrete examples of the salt, halogenides of alkali metals and alkaline earth metals such as calcium chloride, sodium sulfate, sodium chloride, and magnesium sulfate; and water-soluble salts such as sulfates and nitrates may be cited. These salts may be used either singly or in the form of a combination of two or more members. These salts are preferably added to the water phase. Among other salts enumerated above, polyvalent metal salts prove particularly advantageous to the stability of the HIPE during the course of polymerization.

The quantity of the salt to be used is preferably in the range of 0.1–20 parts by mass and more preferably in the range of 0.5–10 parts by mass, based on 100 parts by mass of water. If the quantity of the salt to be used exceeds 20 parts by mass, the excess will induce the wastewater squeezed out of the HIPE to contain a large quantity of salt and increase the cost for the treatment of the wastewater. Further, this excess will make no economic contribution because it cannot be expected to produce a proportionate addition to the inherent effect. If the quantity of the salt to be used falls short of 0.1 part by mass, the shortage will possibly prevent the action and effect of the addition of the salt from being manifested fully satisfactorily.

(g) Other Additive

Other various additives may be used for the purpose of improving the conditions of production and the characteristic properties of the produced HIPE or the performance of the porous polymer. A base and/or a buffer, for example, may be added to adjust the pH. The quantity of such additive to be used is only required to fall in the range in which the addition thereof will induce sufficient manifestation of the performance, function, and economy aimed at. As concrete examples of the additive, activated carbon, inorganic powder, organic powder, metal powder, deodorant, antibacterial agent, mildew proofing agent, perfume, and various macromolecular substances may be cited.

(2) Method for Preparation of HIPE

The HIPE is produced by combining an oil-phase component and a water-phase component at the mass ratio mentioned above and subjecting the resultant mixture to shear mixing. For the purpose of accomplishing the polymerization of an HIPE of low viscosity in a very short period as aimed at by this invention and consequently effecting the production of a porous polymer having a number-average pore diameter of not less than 80 $\mu$m, for example, the polymerization may be performed in a batch process or in a continuous process. It is nevertheless preferable for the HIPE to be formed by emulsification with low shear force. The method for forming the HIPE of such low viscosity as not more than 500 mPa-second, preferably not more than 100 mPa second does not need to be particularly restricted. The known method for the preparation of an HIPE may be properly used as combined with a mixing device, an emulsifying device, or a line mixer, for example.

In this invention, the number-average pore diameter of a porous polymer can be determined by the mercury intrusion method using such a measuring device as an automatic porosimeter, for example.

Now, a typical method for the preparation will be specifically described below.

First, a component for forming an oil phase comprising the aforementioned quantities respectively of a polymerizing monomer, a cross-linking monomer, a surfactant, further an optionally addable oil-soluble polymerization initiator (inclusive of oil-soluble redox polymerization initiator), and other additive is mixed at a prescribed temperature to prepare a homogeneous oil phase.

Meanwhile, a component for forming a water phase comprising the aforementioned quantities respectively of water, an optionally addable water-soluble polymerization initiator (inclusive of a water-soluble redox polymerization initiator), a salt, and other additive was mixed and heated to a prescribed temperature in the range of 30–95° C. to prepare d homogeneous water phase.

Then, by joining the oil phase which is the mixture of a monomer component, a surfactant, etc. and the water phase which is the mixture of water, a water-soluble salt, etc., both prepared as described above, efficiently mixing these phases at the HIPE forming temperature (emulsifying temperature) which will be specifically described herein below, and emulsifying the resultant mixture under application of such a low shear force as not more than 1000 second$^{-1}$, preferably not more than 500 second$^{-1}$, it is made possible to prepare stably an HIPE which exhibits a viscosity of preferably not more than 500 mPa second and more preferably not more than 100 mPa second at the HIPE forming temperature mentioned above.

The viscosity of the HIPE formed as described above at the forming temperature thereof may be measured by the use of a Helipath type viscosimeter, for example, during the induction time prior to the initiation of polymerization. Instead of the measurement during the induction period, the viscosity of an HIPE which has been emulsified under the same conditions except for the omission of the addition of a polymerization initiator may be measured by the same procedure as described above.

As a method for mixing the water phase and the oil phase to prepare stably the HIPE, the procedure which comprises continuously adding the water phase to the oil phase for several minutes to some tens of minutes while keeping the oil phase in a mixed state proves proper. It is also permissible to produce the target HIPE by mixing part of the water-phase component with the oil-phase component thereby forming an HIPE and thereafter adding the remainder of the water-phase component to the desired HIPE while mixing them together. (3) Water Phase/Oil Phase (W/O) Ratio The water phase/oil phase (W/O) ratio (ratio by mass) of the HIPE obtained as described above does not need to be particularly restricted but may be properly selected, depending on the purpose for which the porous polymer possessing open cells is used (such as, for example, a water absorbent, an oil absorbent, a sound absorbent, a filter). It is properly not less than 3/1, preferably in the range of 10/1–100/1, and particularly preferably in the range of 10/1–50/1 as defined previously.

The porosity of the porous polymer is decided by varying the W/O ratio. It is, therefore, preferable to select the W/O ratio so that the porosity to be obtained may agree with the purpose of use. When the porous polymer is used as various absorbents in a disposable diaper or a sanitary material, for example, the W/O ratio is preferred to be set in the approximate range of 10/1–50/1.

(4) Apparatus for Production of HIPE

The apparatus for producing the HIPE does not need to be particularly restricted but may be properly selected from the heretofore known apparatuses of production. As the mixing device (emulsifying device) to be used for mixing a water phase and an oil phase, for example, the mixing devices and kneading devices heretofore known are usable. As concrete examples of the mixing device, mixing devices provided with propeller type, paddle type, or turbine type vanes, homomixers, line mixers, and pin mills may be cited. Any of these devices may be adopted.

(5) HIPE Forming Temperature (Emulsifying Temperature)

The HIPE forming temperature (emulsifying temperature) during the step of emulsification for forming an HIPE is generally in the range of 40–110° C., preferably in the range of 80–110° C. If this forming temperature falls short of 40° C., the shortage will possibly suffer the polymerization to require an unduly longtime, depending on the polymerization temperature. Conversely, if the forming temperature exceeds 110° C., the excess will possibly suffer the HIPE to be deficient in uniformity. Preferably, the HIPE may be formed as expected by adjusting the temperature of an oil phase and/or a water phase in advance to a prescribed forming temperature and the mixing the two phases and emulsifying the produced mixture. It is provided, however, that in the preparation (formation) of an HIPE, since the quantity of the water phase is larger than that of the oil phase, it is advantageous to adjust at least the temperature of the water phase to a prescribed forming temperature (emulsifying temperature). If the monomer component happens to start polymerizing during the course of emulsification, the HIPE may be possibly deprived of stability. When an HIPE containing a polymerization initiator in advance is to be prepared, therefore, the necessity for keeping the HIPE forming temperature at a level not higher than the temperature at which the half life of a given polymerization initiator is 10 hours (10-hour half-life temperature) ought to be taken into consideration. When a polymerization initiator is added at the same time that the HIPE is prepared or when it is added after the preparation of the HIPE, it is necessary to select the method of mixing, the temperature of mixing, etc. so that the polymerization initiator may be added to and mixed with the HIPE fully homogeneously.

[II] Production of Porous Polymer (1) Step for Addition of Polymerization Initiator As a way of adding a water-soluble polymerization initiator and an oil-soluble polymerization initiator to an HIPE in this invention, ① the method of having a polymerization initiator added to and mixed with a water phase and/or an oil phase in advance of the formation of the HIPE, ② the method of adding a polymerization initiator at the same time that an HIPE is formed, and ③ the method of adding a polymerization initiator after an HIPE has been formed may be cited for example. Optionally, these methods may be used as combined. The water-soluble polymerization initiator allows a method fit therefore to be arbitrarily selected from among the methods of ①–③ mentioned above. Since the water phase in the HIPE is discrete, the method of adding a polymerization initiator in advance to the water phase proves preferable. In the case of the method of ①, though the method of adding an oil-soluble polymerization initiator in advance to the oil phase is convenience, the method of adding the product of emulsification of an oil-soluble polymerization initiator to the water phase may be cited as a conceivable approach. Then, the polymerization initiator may be used in an undiluted state or in the form of a solution or dispersion in water or an organic solvent.

When the HIPE forming temperature (emulsifying temperature) is raised to a level exceeding 80° C., however, the monomer component may possibly start polymerizing during the course of emulsification and form a polymer of it, depending on the kind of polymerization initiator and the method for addition of the polymerization initiator. This inclination is particularly conspicuous in the case of an oil-soluble polymerization initiator. To avoid this phenomenon, it is advantageous to effect the addition by the method of ② or ③.

Further, when the polymerization initiator is a redox type initiator and when the polymerization initiator (oxidizing agent) and a reducing agent are added together as well, any of the methods of ①-③ mentioned above may be arbitrarily selected independently.

When the polymerization initiator is added at the same time that an HIPE is formed or after the HIPE has been formed in accordance with the method of ② or ③ respectively, it is important to have the added polymerization initiator quickly and homogeneously mixed in the HIPE for the purpose of avoiding uneven polymerization of the added monomer component. From this point of view, the practice of adding a polymerization initiator to the path extending from the site for the formation of the HIPE to the site for the termination of the forming process via an inlet port and continuously mixing the introduced HIPE with a line mixer such as a static mixer, for example is adopted advantageously. Even in this case, the quantity of the polymerization initiator to be used is the same as described in the paragraph of (e) titled "polymerization initiator" in the section of the raw materials for the HIPE.

(2) Step for Forming HIPE in Expected Form (a) HIPE Forming Temperature and Time The HIPE which has a polymerization initiator mixed therewith is shaped in an expected form. Generally, the temperature for this shaping is in the range of 40–110° C. If this temperature falls short of 40° C., the shortage will prove unfavorable from the viewpoint of curtailing the polymerization time. From this point of view, it is favorable to have the conveyance line extending from the formation of HIPE to the process for the shaping thereof, namely the pipes, the line mixer, etc., and the shaping device heated and insulated fully satisfactorily.

Further, the time to be spent till the HIPE is shaped in an expected form is preferred to be within five minutes.

(b) The Formed Shape of HIPE

The shape in which the HIPE is formed in the method for production according to the present invention does not need to be particularly restricted. The HIPE may be formed in an expected shape by using the method of feeding the HIPE to a vessel of an expected shape or the method of continuously or intermittently feeding the HIPE onto a belt traveling in the form of a sheet or in the form of a film. Any of the heretofore known shapes for the HIPE formation may be properly utilized, depending on the purpose of use.

(3) Polymerizing Step (a) Method for Polymerization

The method for polymerization of an HIPE does not need to be particularly restricted. Any of the heretofore known methods for HIPE polymerization may be properly utilized. Generally, the polymerization of an HIPE is effected by using the method for stationary polymerization of heating a given HIPE under conditions incapable of breaking the structure of the HIPE. In this case, the HIPE may be polymerized in a batch process or in a continuous process of continuously feeding the HIPE into a heating zone and polymerizing it by casting. For the purpose of exalting the productivity, the polymerization prefers the continuous process to the batch process. The method for continuous polymerization of continuously casting an HIPE in the form of a sheet or the form of a film onto a belt in motion and heating the supplied HIPE may be cited, for example. In this case, the method of providing the emulsion on the outer surface part thereof with a specific means to decrease the quantity of oxygen is adopted advantageously.

(b) Polymerizing (Curing) Temperature

The temperature for polymerizing the HIPE according to this invention is generally in the range of 40–110° C. In view of the stability and the rate of polymerization of the HIPE, however, it is preferably in the range of 60–110° C. and more preferably in the range of 80–105° C. If the polymerization temperature falls short of 40° C., the shortage will prove commercially unfavorable because it suffers the polymerization to require an unduly long time. For the purpose of polymerizing an HIPE at the temperature mentioned above, it is advantageous to have the HIPE in conveyance from the step of formation to the step of polymerization insulated and the polymerization vessel heated and insulated fully satisfactorily.

(c) Polymerizing (Curing) Time

The method of this invention for the polymerization of an HIPE is highly effective as a means to implement stably the polymerization in a short period in the range of some tens of seconds—30 minutes. To be specific, the polymerizing (curing) time (hereinafter referred to occasionally as "polymerization time") is preferably not more than 30 minutes, more preferably not more than 10 minutes, and particularly preferably in the range of 1–10 minutes. If the polymerization time exceeds 30 minutes, the excess will possibly prove commercially unfavorable because it renders the polymerization deficient in productivity. Conversely, if the polymerization time falls short of 1 minute, the shortage will possibly induce the produced porous polymer to reveal deficiency in strength. It is provided, however, that this invention does not exclude the use of a polymerization time longer than the upper limit mentioned above.

The term "polymerization time" as used in the present invention refers to the time which extends from immediately after termination of the step for formation described in the paragraph "(2) Step for forming HIPE in expected shape under Section [II] Production of porous polymer" describing the formation of an HIPE having a polymerization initiator mixed therewith in an expected shape to the time when the HIPE is polymerized fully satisfactorily.

Then, the polymerization time in the present invention is not more than 30 minutes, and the polymerization is preferably so controlled that the quantity of an oil-soluble polymerization initiator to be decomposed within the polymerization time mentioned above may be preferably in the range of 0.05–5.00 mol % and more preferably in the range of 0.5–3.00 mol %. By controlling the quantity in this range, it is made possible to produce a porous polymer excelling in the physical properties as porous polymer within a short period of not more than 30 minutes with very high productivity. The quantity of a polymerization initiator to be used and the quantity of the polymerization initiator decomposed within the polymerization time are not different from those described in the paragraph (1) (e) Polymerization initiator under the Section "[I] Raw materials to be used for HIPE" mentioned above.

(d) Polymerization Apparatus

The polymerization apparatus that is usable in this invention does not need to be particularly restricted but may be properly selected from among the heretofore known chemical apparatus and put to use as modified to suit the specific method of polymerization. The batch polymerization can utilize a polymerization vessel of the shape conforming to the purpose of use and the continuous polymerization can utilize such a continuous polymerization apparatus as a belt conveyor which is furnished with a compressive roller, for example. Such a polymerization apparatus may have annexed thereto a temperature elevating means and a controlling means which fit the method of polymerization (such as, for example, active thermal energy ray such as microwave or infrared ray which can utilize radiation energy and a temperature elevating means capable of quickly elevating the temperature to the hardening temperature with such a heat medium as hot water or hot wind), though not exclusively. Further, the fact of keeping the surface of the HIPE cast in a polymerization vessel in the case of the batch polymerization and the surface (both upper and lower side) part of the HIPE formed on a driven conveying member such as a conveyor in the case of the continuous polymerization out of contact with the air (precisely, the oxygen component in the air) from the time the polymerization is started till the time the polymerization is completed proves advantageous for the purpose of imparting a suitable open cell structure to the surface part of a porous polymer. It is, therefore, proper to have the surface of HIPE with a various sealing material. The quality of the material for such a polymerization apparatus does not need to be particularly restricted. As concrete examples of the material, metals such as aluminum, iron, and stainless steel (inclusive of alloys thereof); synthetic resins such as polyethylene, polypropylene, fluorocarbon resin, polyvinyl chloride, and unsaturated polyester resin;

and fiber-reinforced resin (FRP) formed by reinforcing such synthetic resin with glass fibers or carbon fibers may be cited.

(4) Aftertreatment of Porous Polymer

The shape of the porous polymer which is obtained by the step of polymerization mentioned above does not need to be particularly restricted but may be selected arbitrarily. Specifically, in the batch polymerization, since the porous polymer is obtained in the same shape as a polymerization vessel in use, it is adequate to select the polymerization vessel of a shape which conforms to the porous polymer aimed at. Further, the HIPE may be polymerized in the shape of a block (or sheet) having a thickness of not more than 50 mm, for example, and the shaped polymer consequently produced may be worked into an arbitrary shape as being sliced into sheets or films (plates or thin plates) each measuring 5 mm in thickness. The porous polymer obtained in the shape of a cylinder measuring 50 mm in wall thickness may be properly cut into pieces of an arcuate section.

Where the method of continuous polymerization is used to, the HIPE of the shape of a sheet or a film may be polymerized as conveyed horizontally to form a porous polymer in the expected shape of a sheet or a film. Again in this case, the HIPE may be polymerized in the shape of a block (or sheet) not more than 50 mm in thickness and then worked in an arbitrary shape as being cut into sheets each measuring 5 mm in thickness.

(5) Step of Aftertreatment (Reduction to Finished Product) After Formation of Porous Polymer (a) Dehydration The porous polymer formed in consequence of the completion of polymerization is generally dehydrated by compression or suction under vacuum or the combination thereof. By this dehydration, the 50–98 mass % of the water used is removed from the porous polymer and the remainder thereof is retained as deposited in the porous polymer.

The ratio of dehydration is properly set, depending on the use for the porous polymer. Generally, it is set so that the water content may be in the range of 1–10 g, preferably in the range of 1–5 g based on 1 g of the porous polymer in a thoroughly dried state.

(b) Compression

The porous polymer of this invention may be given a state compressed to one out of several parts of the original thickness, depending on the kind of object. For the formation of the compressed state, it suffices to adopt a compressing means conforming to the shape of the porous polymer so that the whole volume of the porous polymer may be uniformed compressed under uniform pressure.

The temperature at which the porous polymer is compressed during the preceding step of dehydration and the present step of compression is preferred to be higher than the glass transition point of the porous polymer. If this temperature is lower than the glass transition point of the porous polymer, the shortage will possibly result in destroying the porous texture or altering the pore diameter.

(c) Washing

The porous polymer may be washed with purified water, an aqueous solution containing an arbitrary additive, or a solvent for the purpose of improving the surface condition of the porous polymer.

(d) Drying

The porous polymer which is obtained by the steps described above, when necessary, may be thermally dried with hot wind or microwave or may be humidified for adjustment of water content.

(e) Cutting

The porous polymer obtained by the steps described above, when necessary, may be cut in necessary shape and size and processed to obtain a finished product meeting a target application.

(f) Impregnation

The porous polymer may be given with functionality by being subjected to a process for impregnation of such additives as detergent, perfume, deodorant, and antibacterial agent.

According to this invention, a porous polymer possessing a uniform porous polymer structure having a number-average pore diameter of not less than 80 $\mu$m and highly excelling in absorbency and physical properties can be efficiently produced in a very short heretofore-unexpected period of not more than 30 minutes, preferably not more than 10 minutes. Further, the method of production contemplated by this invention is truly excellent also commercially because this method, when applied to continuous polymerization, permits continuous manufacture of the porous polymer with high productivity.

Now, this invention will be described more specifically with reference to working examples adduced herein below. Incidentally, the performance of a porous cross-linked polymer material in the working examples was determined and evaluated as shown below.

<Residual Nonomer>

An obtained porous polymer 1.0 g was added to 200 g of methylene chloride and mixed therein for two hours and the resultant mixture was filtered. The filtrate was concentrated to dryness in an evaporator. The produced concentrate was dissolved in a mixture of acetonitrile/water=80/20(ratio by volume). The concentration of the component monomers in the solution was measured by liquid chromatography to determine the residual monomers of the porous polymer.

<Gel Fraction>

A porous polymer was subjected to an extraction treatment in a Soxhlet extractor using acetone as a solvent for 24 hours. The residue of the porous polymer which had survived the extraction was dried in hot air at 100° C. for one hour to determine the dry mass by the calculation using Formula 7 given below.

Gel fraction(%)=(Mass of porous polymer after extraction and drying/Mass of porous polymer before extraction)×100 (Formula 7)

<Compressive Strength>

A porous polymer was tested for uniaxial (in the direction of thickness) compressive strength with a tester (made by Instron Corp. and sold under the trademark designation of "Instron 1186-RE5500") at 24° C.

<Measurement of Viscosity>

A HIPE immediately after the emulsification had finished was collected in a polypropylene cup with 80 mm in inside diameter and 100 mm in height and tested for viscosity with a Helipath type viscosimeter (made by Brookfield Corp. and sold under the trademark designation of "Digital Rheometer DV-III, T-letter spindle A type") operated at a rotational frequency of 100 rpm. The temperature for the measurement was identical with the forming temperature.

<Number-Average Pore Diameter>

A given porous polymer produced by polymerizing an HIPE was washed with deionized water, dried under reduced pressure at 100° C. for one hour, and cut to obtain a sample segment 0.02 g in quantity. This sample was tested for number-average pore diameter by the method of mercury intrusion using an automatic porosimeter (made by Micromeritics Corp. and sold under the trademark designation of "Autopore III9420").

EXAMPLE 1

In a cylindrical vessel provided with a mixing device, a monomer component comprising 3.0 parts by weight (hereinafter referred to simply as "parts") of 2-ethylhexyl acrylate and 1.8 parts of 55% divinyl benzene (the balance of p-ethyl vinyl benzene) was placed together with 0.25 part of sorbitan monooleate as an oil-soluble surfactant and they were uniformly dissolved to prepare an oil phase mixture solution (hereinafter referred to as "oil phase"). Separately, a water phase aqueous solution (hereinafter referred to as "water phase") was prepared by dissolving 9 parts of calcium chloride in 209 parts of deionized water and heated to 85° C. While the oil phase was kept stirred at 85° C. and 500 second$^{-1}$, the water phase adjusted to 85° C. was added to the stirred oil phase over a period of five minutes. After the addition was completed, they were continuously mixed for 10 minutes to obtain a stable HIPE having a W/O ratio=45/1.

This HIPE and a solution of 0.128 part of potassium persulfate as a water-soluble polymerization initiator and 0.213 part of t-butylperoxy (2-ethylhexanoate (made by Nippon Oils & Fats Co., Ltd. and sold under the trademark designation of "Perbutyl 0") as an oil-soluble polymerization initiator added thereto were further mixed at 500 second$^{-1}$ for two minutes. The viscosity of the HIPE was 100 mPa second.

The produced HIPE was cast in a square polymerization vessel made of stainless steel and measuring 1100 mm in length, 100 mm in width, and 5 mm in thickness. The vessel was furnished with a thermocouple (as the HIPE before polymerization is yogurt-like, the thermocouple was positioned in the central part of the vessel, which applies similarly herein after), stoppered on the upper side with a rid, and immersed in a water bath at 97° C. The HIPE reached 95° C. in about 30 seconds. The polymerization temperature of the HIPE was 95° C.

After the elapse of 7 minutes, the vessel was pulled out of the water bath and dipped in an ice bath to stop the polymerization. Thus, a porous polymer (1) was obtained (Hereinafter, the time from the immersion of the vessel in the water bath till the extraction thereof from the water bath and the immediate immersion thereof in the ice bath will be reported as "polymerization time"). The quantity of the oil-soluble polymerization initiator decomposed during the 7 minutes was 0.32 mol % (relative to the quantity of the monomer component). The porous polymer (1) was withdrawn and tested for gel fraction, residual monomer, compressive strength, and number-average pore diameter. The results are shown in Table 1 given below.

EXAMPLE 2

A porous polymer (2) was obtained by repeating the procedure of Example 1 while changing the polymerization time to 10 minutes. The quantity of the oil-soluble polymerization initiator decomposed within the 10 minutes was 0.46 mol %. This porous polymer (2) was withdrawn and tested for gel fraction, residual monomer, compressive strength, and number-average pore diameter. The results are shown in Table 1 given below.

EXAMPLE 3

A porous polymer (3) was obtained by repeating the procedure of Example 1 while forming the HIPE by mixing at 1000 second$^{-1}$ to impart a viscosity of 500 mPa second to the formed HIPE. The quantity of the oil-soluble polymerization initiator decomposed within the 7 minutes was 0.32 mol % (relative to the quantity of the monomer component). This porous polymer (3) was withdrawn and tested for gel fraction, residual monomer, compressive strength, and number-average pore diameter. The results are shown in Table 1 given below.

EXAMPLE 4

A porous polymer (4) was obtained by repeating the procedure of Example 1 while using 0.277 part of 1,1,3,3-tetramethyl butyl peroxy 2-ethyl hexanoate (made by Nippon Oils & Fats Co., Ltd. and sold under the trademark designation of "Perocta O") as an oil-soluble polymerization initiator. The quantity of the oil-soluble polymerization initiator decomposed within the 7 minutes was 0.70 mol % (relative to the quantity of the monomer component). This porous polymer (4) was withdrawn and tested for gel fraction, residual monomer, compressive strength, and number-average pore diameter. The results are shown in Table 1 given below.

EXAMPLE 5

A porous polymer (5) was obtained by repeating the procedure of Example 1 while using 0.554 part of 1,1,3,3-tetramethyl butyl peroxy-2-ethyl hexanoate (made by Nippon Oils & Fats Co., Ltd. and sold under the trademark designation of "Perocta O") as an oil-soluble polymerization initiator and changing the polymerization time to 5 minutes. The quantity of the oil-soluble polymerization initiator decomposed within 5 minutes was 1.03 mol % (relative to the quantity of the monomer component). This porous polymer (5) was withdrawn and tested for gel fraction, residual monomer, compressive strength, and number-average pore diameter. The results are shown in Table 1 given below.

EXAMPLE 6

A porous polymer (6) was obtained by repeating the procedure of Example 1 while using 0.177 part of t-butylperoxy pivalate (made by Nippon Oils & Fats Co., Ltd. and sold under the trademark designation of "Perbutyl PV") as an oil-soluble polymerization initiator. The quantity of the oil-soluble polymerization initiator decomposed within the 7 minutes was 1.95 mol % (relative to the quantity of the monomer component). This porous polymer (6) was withdrawn and tested for gel fraction, residual monomer, compressive strength, and number-average pore diameter. The results are shown in Table 1 given below.

EXAMPLE 7

In a cylindrical vessel provided with a mixing device, a monomer component comprising 3.0 parts of 2-ethylhexyl acrylate and 1.8 parts of 55% divinyl benzene (the balance of p-ethyl vinyl benzene) was placed together with 0.25 part of sorbitan monooleate as an oil-soluble surfactant and they were uniformly dissolved to prepare an oil phase. Separately, a water phase was prepared by uniformly dissolving 9 parts of calcium chloride in 209 parts of deionized water and heated to 85° C. To prepare an initiator water phase, 0.128 part of potassium persulfate was dissolved in 10 parts of deionized water.

While the oil phase was kept stirred at 85° C. and 500 second$^{-1}$, the water phase and the initiator water phase adjusted to 85° C. were added to the stirred oil phase over a period of five minutes. After the addition was completed, they were continuously mixed for 10 minutes to obtain a stable HIPE having a W/O ratio=45/1. This HIPE and 0.277 part of t-butylperoxy (2-ethylhexanoate) (made by Nippon Oils & Fats Co., Ltd. and sold under the trademark designation of "Perbutyl O") added thereto as an oil-soluble polymerization initiator were together mixed additionally for two minutes at 500 second$^{-1}$. The viscosity of the HIPE was 100 mPa second.

The produced HIPE was cast in a square polymerization vessel made of stainless steel and measuring 1100 mm in length, 100 mm in width, and 5 mm in thickness. The vessel, similarly to Example 1, was furnished with a thermocouple, stoppered on the upper side with a rid, and immersed in a water bath at 97° C. The HIPE reached 95° C. in about 30 seconds. The polymerization temperature of the HIPE was 95° C. After the elapse of 7 minutes, the vessel was pulled out of the water bath and dipped in an ice bath to stop the polymerization. Thus, a porous polymer (7) was obtained. The quantity of the oil-soluble polymerization initiator decomposed during the 7 minutes was 0.32 mol % (relative to the quantity of the monomer component). The porous polymer (7) was withdrawn and tested for gel fraction, residual monomer, compressive strength, and number-average pore diameter. The results are shown in Table 1 given below.

EXAMPLE 8

In a cylindrical vessel provided with a mixing device, a monomer component comprising 3.0 parts of 2-ethylhexyl acrylate and 1.8 parts of 55% divinyl benzene (the balance of p-ethyl vinyl benzene) was placed together with 0.25 part of sorbitan monooleate as an oil-soluble surfactant and they were uniformly dissolved to prepare an oil phase. Separately, a water phase was prepared by uniformly dissolving 10 parts of calcium chloride in 90 parts of deionized water and heated to 85° C.

While the oil phase was kept stirred at 85° C. and 500 second$^{-1}$, the water phase adjusted to 85° C. was added to the stirred oil phase over a period of five minutes. After the addition was completed, they were continuously mixed for 10 minutes to obtain a stable HIPE having a W/O ratio=21/1.

This HIPE and a solution of 0.128 part of potassium persulfate as a water-soluble polymerization initiator in 10 parts of deionized water and 0.22 part of t-butylperoxy (2-ethylhexanoate) (made by Nippon Oils & Fats Co., Ltd. and sold under the trademark designation of "Perbutyl O") as an oil-soluble polymerization initiator both added thereto were further mixed for two minutes at 500 second$^{-1}$. The viscosity of the HIPE was 100 mPa second.

The produced HIPE was cast in a square polymerization vessel made of stainless steel and measuring 1100 mm in length, 100 mm in width, and 5 mm in thickness. The vessel, similarly to Example 1, was furnished with a thermocouple, stoppered on the upper side with a rid, and immersed in a water bath at 97° C. The HIPE reached 95° C. in about 30 seconds. The polymerization temperature of the HIPE was 95° C. After the elapse of 7 minutes, the vessel was pulled out of the water bath and dipped in an ice bath to stop the polymerization. Thus, a porous polymer (8) was obtained. The quantity of the oil-soluble polymerization initiator decomposed during the 7 minutes was 0.32 mol % (relative to the quantity of the monomer component). The porous polymer (8) was withdrawn and tested for gel fraction, residual monomer, compressive strength, and number-average pore diameter. The results are shown in Table 1 given below.

EXAMPLE 9

An oil phase was prepared by joining a monomer component comprising 300 parts of 2-ethyl hexyl acrylate and 180 parts of 55% divinyl benzene (the balance of p-ethyl vinyl benzene) and 25 parts of sorbitan monooleate as an oil phase surfactant and uniformly dissolving them. Separately, a water phase was prepared by dissolving 3 parts of calcium chloride and 12.8 parts of potassium persulfate as a water-soluble polymerization initiator in 21900 parts of deionized water and heated to 85° C. These two phases were continuously supplied into a mixing device at a W/O ratio of 45/1, adjusted to 85° C., and mixed meantime at 500 second$^{-1}$. The resultant mixture and 22 parts of t-butyl peroxy (2-ethylhexanoate) (made by Nippon Oils & Fats. Co., Ltd. and sold under the trademark designation of "Perbutyl O") continuously added as an oil-soluble polymerization initiator thereto were together mixed till emulsification. The viscosity of the produced HIPE was 100 mPa∩second.

The HIPE formed by the procedure mentioned above was continuously withdrawn and supplied continuously in the form of a slab 50 cm in width and 5 mm in thickness onto a belt disposed horizontally and moved at a fixed speed. The slab of the HIPE was passed through a polymerization zone controlled at about 95° C. in about 10 minutes to elevate the temperature thereof to 95° C. in 30 seconds and polymerize it at 95° C. Thus, a porous polymer (9) was obtained. The quantity of the oil-soluble polymerization initiator decomposed within the 10 minutes was 0.46 mol % (relative to the quantity of the monomer component). This porous polymer (9) was withdrawn and tested for gel fraction, residual monomer, compressive strength, and number-average pore diameter. The results are shown in Table 1 given below.

COMPARATIVE EXAMPLE 1

In a cylindrical vessel provided with a mixing device, a monomer component comprising 3.0 parts of 2-ethylhexyl acrylate and 1.8 parts of 55% divinyl benzene (the balance of p-ethyl vinyl benzene) was placed together with 0.25 part of sorbitan monooleate as an oil-soluble surfactant and they were uniformly dissolved to prepare an oil phase. Separately, a water phase was prepared by dissolving 3 parts of calcium chloride in 209 parts of deionized water and heated to 85° C.

While the oil phase was kept stirred at 85° C. and 500 second$^{-1}$, the water phase adjusted to 85° C. was added to the stirred oil phase over a period of five minutes. After the addition was completed, they were continuously mixed for 10 minutes to obtain a stable HIPE having a W/O ratio=45/1.

This HIPE and a solution of 0.128 part of potassium persulfate as a water-soluble polymerization initiator in 10 parts of deionized water added thereto were further mixed for two minutes at 500 second$^{-1}$. The viscosity of the HIPE was 100 mPa·second.

The produced HIPE was cast in a square polymerization vessel made of stainless steel and measuring 1100 mmin length, 100 mm in width, and 5 mm in thickness. The vessel was furnished with a thermocouple, stoppered on the upper side with a rid, and immersed in a water bath at 97° C. After the elapse of 10 minutes, the vessel was pulled out of the water bath and opened to find that the HIPE had been disintegrated. The results are shown in Table 1 given below.

COMPARATIVE EXAMPLE 2

A HIPE produced by repeating the procedure of Comparative Example 1 while using a solution of 0.451 part of sodium persulfate as a water-soluble polymerization initiator in 10 parts of deionized water had been disintegrated. The results are shown in Table 1 given below.

COMPARATIVE EXAMPLE 3

An HIPE produced by repeating the procedure of Comparative Example 2 while changing the polymerization time to 60 minutes had been disintegrated. The results are shown in Table 1 given below.

COMPARATIVE EXAMPLE 4

A porous polymer (4) for comparison was obtained by repeating the procedure of Comparative Example 2 while forming the HIPE by mixing at 1000 second$^{-1}$ to impart a viscosity of 500 mPa·second to the HIPE and changing the polymerization time of the HIPE to 60 minutes. This porous polymer (4) was withdrawn and tested for gel fraction, residual monomer, compressive strength, and pore diameter distribution. The results are shown in Table 1 given below.

COMPARATIVE EXAMPLE 5

In a cylindrical vessel provided with a mixing device, a monomer component comprising 3.0 parts of 2-ethylhexyl acrylate and 1.8 parts of 55% divinyl benzene (the balance of p-ethyl vinyl benzene) was placed together with 0.25 part of sorbitan monooleate as an oil-soluble surfactant and they were uniformly dissolved to prepare an oil phase. Separately, a water phase was prepared by dissolving 3 parts of calcium chloride and 0.128 part of potassium persulfate in 219 parts of deionized water and heated to 85° C.

While the oil phase was kept stirred at 85° C. and 500 second$^{-1}$, the water phase adjusted to 85° C. was added to the stirred oil phase over a period of five minutes. After the addition was completed, they were continuously mixed for 10 minutes to obtain a stable HIPE having a W/O ratio=45/1. The viscosity of this HIPE was 100 mPa·second.

The produced HIPE was cast in a square polymerization vessel made of stainless steel and measuring 1100 mm in length, 100 mm in width, and 5 mm in thickness. The vessel was furnished with a thermocouple, stoppered on the upper side with a rid, and immersed in a water bath at 97° C. The polymerization temperature of the HIPE was 95° C. After the elapse of 30 minutes, the vessel was pulled out of the water bath to obtain a porous polymer (5) for comparison. This porous polymer (5) was withdrawn and tested for gel fraction, residual monomer, compressive strength, and pore diameter distribution. The results are shown in Table 1 given below.

TABLE 1

| | Curing time (min.) | Viscosity of HIPE (mPa·second) | Water-soluble polymerization initiator | | Oil-soluble polymerization initiator | | | gel fraction (%) | Residual monomer (%) | Compressive strength (kPa) | Number-average pore diameter (μm) |
|---|---|---|---|---|---|---|---|---|---|---|---|
| | | | Name of compound | Quantity to be used (mol %) | Name of compound | Quantity to be used (mol %) | Quantity of oil-soluble polymerization initiator decomposed (mol %) | | | | |
| Example | | | | | | | | | | | |
| 1 | 7 | 100 | Potassium persulfate | 1.58 | t-butyl-peroxy (2-ethyl-hexanoate) | 3.16 | 0.32 | 93.4 | 0.1 | 1.38 | 110 |
| 2 | 10 | 100 | Potassium persulfate | 1.58 | t-butyl-peroxy (2-ethyl-hexanoate) | 3.16 | 0.46 | 93.8 | N.D | 2.07 | 107 |
| 3 | 7 | 500 | Potassium persulfate | 1.58 | t-butyl-peroxy (2-ethyl-hexanoate) | 3.16 | 0.32 | 93.3 | 0.2 | 1.6 | 80 |
| 4 | 7 | 100 | Potassium persulfate | 1.58 | 1,1,3,3-tetra-methyl-ethyl-butyl-peroxy (2-ethyl-hexanoate) | 3.16 | 0.46 | 93.5 | N.D | 2.07 | 110 |
| 5 | 5 | 100 | Potassium persulfate | 1.56 | 1,1,3,3-tetra-methyl-ethyl butyl peroxy (2-ethyl-hexanoate) | 6.32 | 1.03 | 94.5 | N.D | 1.99 | 105 |
| 6 | 7 | 100 | Potassium persulfate | 1.58 | t-butyl-peroxy pivalate | 3.16 | 1.95 | 95.2 | N.D | 1.97 | 106 |
| 7 | 7 | 100 | Potassium persulfate | 1.58 | t-butyl-peroxy | 3.16 | 0.32 | 93.4 | 0.1 | 1.38 | 120 |

TABLE 1-continued

| | Curing time (min.) | Viscosity of HIPE (mPa · second) | Water-soluble polymerization initiator | | Oil-soluble polymerization initiator | | | gel fraction (%) | Residual monomer (%) | Compressive strength (kPa) | Number-average pore diameter (μm) |
| | | | Name of compound | Quantity to be used (mol %) | Name of compound | Quantity to be used (mol %) | Quantity of oil-soluble polymerization initiator decomposed (mol %) | | | | |
|---|---|---|---|---|---|---|---|---|---|---|---|
| 8 | 7 | 100 | Potassium persulfate | 1.58 | (2-ethyl-hexanoate) t-butyl-peroxy | 3.16 | 0.32 | 92.9 | 0.3 | 1.32 | 108 |
| 9 | 10 | 100 | Potassium persulfate | 1.58 | (2-ethyl-hexanoate) t-butyl-peroxy (2-ethyl-hexanoate) | 3.16 | 0.46 | 93.7 | 0.1 | 1.89 | 122 |
| Comparative Example | | | | | | | | | | | |
| 1 | 10 | 100 | Potassium persulfate | 1.58 | — | — | — | 13.5 | 85.7 | — | — |
| 2 | 10 | 100 | Sodium persulfate | 1.58 | — | — | — | 21.2 | 77.7 | — | — |
| 3 | 60 | 100 | Sodium persulfate | 1.58 | — | — | — | 19.8 | 79.2 | — | — |
| 4 | 60 | 500 | Sodium persulfate | 1.58 | — | — | — | 57.9 | 39.2 | 0.04 | — |
| 5 | 30 | 100 | Sodium persulfate | 1.58 | — | — | — | 70.8 | 25.5 | 0.05 | — |

INDUSTRIAL APPLICABILITY

In accordance with this invention, by using an oil-soluble polymerization initiator as a polymerization initiator, it is made possible to produce a porous polymer in a very short period even when an HIPE having a very low viscosity of not more than 500 mPa·second is used or when a porous polymer possessing a large pore diameter is produced. Further, the porous polymer so obtained exhibits outstanding characteristics regarding the gel fraction, residual monomer, and compressive strength.

This invention can be extensively utilized for the manufacture of (1) liquid absorbents such as, for example, ① core materials for disposable diapers, i.e. absorbents for such humors as urine and blood and ② agents for disposal of waste water, waste oil, and waste solvent, i.e. absorbents for water, aqueous liquids, oils, and organic solvents as well, also in (2) energy absorbents such as sound insulators and heat insulators for automobiles and buildings, i.e. absorbents for sound and heat, and further (3) bases for impregnation with pharmaceutical preparations such as household articles impregnated with aromatizing agent, detergent, lustering agent, surface protecting agent, and flame retardant.

What is claimed is:

1. A method for producing a porous polymer comprising a step of polymerizing a water-in-oil type high internal phase emulsion obtainable from an oil phase containing a monomer component and a surfactant and a water phase containing water in the presence of a polymerization initiator, wherein the viscosity of the water-in-oil type high internal phase emulsion at the temperature for the formation of the emulsion is not more than 500 mPa·second, and the polymerization initiator comprises an oil-soluble polymerization initiator.

2. A method for producing a porous polymer comprising a step of polymerizing a water-in-oil type high internal phase emulsion obtainable from an oil phase containing a monomer component and a surfactant and a water phase containing water in the presence of a polymerization initiator, wherein the number-average pore diameter of the porous polymer is not less than 80 μm, and the polymerization initiator comprises an oil-soluble polymerization initiator.

3. A method according to claim 1, wherein the polymerization initiator comprises an oil-soluble polymerization initiator and a water-soluble polymerization initiator.

4. A method according to claim 1, wherein the polymerization time of the water-in-oil type high internal phase emulsion is not more than 30 minutes.

5. A method according to claim 1, wherein the quantity of the oil-soluble polymerization initiator is in the range of 0.05–15 mol % based on the quantity of the monomer component of the water-in-oil type high internal phase emulsion, and the quantity of the oil-soluble polymerization initiator decomposed within the polymerization time is controlled in the range of 0.05–5 mol % based on the quantity of the monomer component in the water-in-oil type high internal phase emulsion.

6. A method according to claim 1, wherein the porous polymer is produced by continuous polymerization process.

7. A method according to claim 2, wherein the polymerization initiator comprises an oil-soluble polymerization initiator and a water-soluble polymerization initiator.

8. A method according to claim 2, wherein the polymerization time of the water-in-oil type high internal phase emulsion is not more than 30 minutes.

9. A method according to claim 3, wherein the polymerization time of the water-in-oil type high internal phase emulsion is not more than 30 minutes.

10. A method according to claim 7, wherein the polymerization time of the water-in-oil type high internal phase emulsion is not more than 30 minutes.

11. A method according to claim 2, wherein the quantity of the oil-soluble polymerization initiator is in the range of 0.05–15 mol % based on the quantity of the monomer component of the water-in-oil type high internal phase emulsion, and the quantity of the oil-soluble polymerization initiator decomposed within the polymerization time is controlled in the range of 0.05–5 mol % based on the quantity of the monomer component in the water-in-oil type high internal phase emulsion.

12. A method according to claim 3, wherein the quantity of the oil-soluble polymerization initiator is in the range of 0.05–15 mol % based on the quantity of the monomer component of the water-in-oil type high internal phase emulsion, and the quantity of the oil-soluble polymerization initiator decomposed within the polymerization time is controlled in the range of 0.05–5 mol % based on the quantity of the monomer component in the water-in-oil type high internal phase emulsion.

13. A method according to claim 4, wherein the quantity of the oil-soluble polymerization initiator is in the range of 0.05–15 mol % based on the quantity of the monomer component of the water-in-oil type high internal phase emulsion, and the quantity of the oil-soluble polymerization initiator decomposed within the polymerization time is controlled in the range of 0.05–5 mol % based on the quantity of the monomer component in the water-in-oil type high internal phase emulsion.

14. A method according to claim 7, wherein the quantity of the oil-soluble polymerization initiator is in the range of 0.05–15 mol % based on the quantity of the monomer component of the water-in-oil type high internal phase emulsion, and the quantity of the oil-soluble polymerization initiator decomposed within the polymerization time is controlled in the range of 0.05–5 mol % based on the quantity of the monomer component in the water-in-oil type high internal phase emulsion.

15. A method according to claim 8, wherein the quantity of the oil-soluble polymerization initiator is in the range of 0.05–15 mol % based on the quantity of the monomer component of the water-in-oil type high internal phase emulsion, and the quantity of the oil-soluble polymerization initiator decomposed within the polymerization time is controlled in the range of 0.05–5 mol % based on the quantity of the monomer component in the water-in-oil type high internal phase emulsion.

16. A method according to claim 9, wherein the quantity of the oil-soluble polymerization initiator is in the range of 0.05–15 mol % based on the quantity of the monomer component of the water-in-oil type high internal phase emulsion, and the quantity of the oil-soluble polymerization initiator decomposed within the polymerization time is controlled in the range of 0.05–5 mol % based on the quantity of the monomer component in the water-in-oil type high internal phase emulsion.

17. A method according to claim 10, wherein the quantity of the oil-soluble polymerization initiator is in the range of 0.05–15 mol % based on the quantity of the monomer component of the water-in-oil type high internal phase emulsion, and the quantity of the oil-soluble polymerization initiator decomposed within the polymerization time is controlled in the range of 0.05–5 mol % based on the quantity of the monomer component in the water-in-oil type high internal phase emulsion.

18. A method according to claim 2, wherein the porous polymer is produced by continuous polymerization process.

19. A method according to claim 3, wherein the porous polymer is produced by continuous polymerization process.

20. A method according to claim 4, wherein the porous polymer is produced by continuous polymerization process.

21. A method according to claim 5, wherein the porous polymer is produced by continuous polymerization process.

22. A method according to claim 6, wherein the porous polymer is produced by continuous polymerization process.

* * * * *